United States Patent Office 3,477,406
Patented Nov. 11, 1969

3,477,406
METHOD OF CULTIVATION OF PENAEID SHRIMP
Motosaku Fujinaga, Tokyo, Japan, assignor, by direct and mesne assignments, to Marifarms, Incorporated, a corporation of Delaware
Filed June 29, 1967, Ser. No. 650,067
Int. Cl. A01k 61/00
U.S. Cl. 119—2                                            40 Claims

ABSTRACT OF THE DISCLOSURE

Shrimp, especially the penaeid species, are spawned, hatched and fed under artificially controlled conditions to accelerate growth to marketable sizes. Species are selected for long or optimum spawning seasons and for maximum early growth rates which combine for maximum continuity and production. Food in early stages, comprising plankton and artemia, is grown and nourished under conditions to maximize food supply for the shrimp while keeping the system self purged from adverse contamination. Natural sea water is used, with suitable filtering to exclude predatory fish and other creatures. In later development stages invertebrate sea food supplements are added with appropriate controls to avoid contamination. Spawning and hatching tanks and culture tanks may be separate, or may be included with suitable partition means in larger cultivation ponds, or alternatively, single tanks or vessels may be used continuously for growing the shrimp from freshly hatched larvae to adulthood, by appropriate and periodic changes in lighting, introduction of changing food and other nutrients in suitable sequence.

BACKGROUND

Ocean shrimp, especially the penaeid species of shrimp, as a food resource for human consumption, is one of the most important fishery products among the crustacea. In the past researchers have attempted to find a successful way to cultivate such shrimp artificially but such attempts, in general, have been futile, due to many unsolved problems. As a result the artificial cultivation of penaeid shrimp on a commercial scale has been considered impossible.

In July 1933, Dr. M. Fujinaga (Hudinaga), the author who had been experimenting with *Penaeus japonicus* (Kuruma shrimp), reported a discovery that this species could spawn in a controlled environment and that the eggs could be easily hatched in a laboratory tank. (Hudinaga, M. 1935. "Studies on the Development of *Penaeus japonicus*, Bate," Rept. Hayatome Fishery Inst., vol I, No. 1.) Later studies of other species of penaeid shrimp indicated that other species also can be spawned and hatched in the artificial environment of a hatching tank. (Hudinaga, M. 1941. "On the Nauplius Stages of *Penaeopsis monocers* and *Penaeopsis affinis*," Suisan Gakkwai Ho, vol. VIII, Nos. 3, 4.) Thus the possibility of spawning and hatching of several types of penaeid shrimp in artificial environments has been known through Dr. Fujinaga's experiments for some time. However, numerous problems have prevented commercial success in growing shrimp until the present invention was made.

The larvae of the penaeid shrimp which are just hatched are usually called nauplii. At this stage the tiny larvae are in a healthy condition because they are sustained by the yolk which is carried within their bodies. The nauplii do not require external food at this stage. However, when the nauplii have metamorphosed to the next or zoea (protozoea) stage, the yolk will have been absorbed completely and the larvae must start taking food. A really suitable food for the larvae during this stage was long unknown at that time, but it has been discovered after long experimentation that one of the species of diatom, *Skeletonema costatum*, a pure cultured species, is a most suitable food for the larvae in the zoea stage. After passing the zoea stage, the larvae will metamorphose in sequence from the mysis to various progressive postlarbal stages. When the larvae reaches the mysis stage it can start taking animal protein type food. Earlier research has indicated that the larvae from nauplii to early postlarval stages pass through a plankton-like development and the food for the larvae must be of plankton type. Through these experiments some fundamental and basic procedures for establishing artificial shrimp cultivation were determined, but practical problems still prevented commercial development. (Hudinaga, M. 1942. "Reproduction, Development and Rearing of *Penaeus japonicus*".)

Considerable basic research on cultivation of shrimp was done by 1942. However, the practical cultivation of shrimp on a commercial scale took much longer, and was further delayed by the Second World War. Further and important fundamental problems of artificial culture of shrimp, that is, production of the young shrimp in quantity with considerably reduced costs, began to be achieved by experiments carried out in 1964 and 1965. The present invention involves the successful culmination of this work.

According to the present invention, then, artificial production of the young shrimp in virtually unlimited quantity is possible. The process appears to be able to supply any number of growing ponds. Problems of structure design of the growing ponds, feeding problems, problems of oxygen supply, and other problems in operating the large commercial scale of shrimp cultivation were solved in part by 1960 with promising results, but the present invention involves further and substantial improvements.

By proper selection, sites for cultivation of shrimp in relatively desolated areas, where there has been no productivity of shrimp in the past, can be achieved with volume production of high quality. This promises to become a substantial contribution to the world's need for animal protein. This appears to be of special significance, indicating a substantial future contribution by the shrimp cultivation industry to solving the growing world problem of food protein shortage, which otherwise will become most serious before the end of this century. The conversion of currently non-productive, unused areas in tropical and subtropical coastal and bay regions into efficient animal protein producing industrial areas can be thus accomplished employing scientific coordination, utilization of natural energies, and use of simple economical and accessible materials such as organic and non-organic fertilizers, without exhausting the natural shrimp resources.

SUMMARY OF INVENTION

Matured female shrimp, selected as to species for good growth rates and spawning habits, are placed in suitably darkened hatching tanks for spawning and are removed after spawning is completed. Thereafter, the eggs are hatched, under suitable climate control, and seawater suitably filtered but containing selected diatomaceous food in suspension is circulated, with appropriate aeration, to bring the food to the larvae. As the latter become capable of locomotion, other types of food, including artemia (brine shrimp) specifically, are introduced. The specific cultivation of artemia which feed on micro organisms and other animal foodstuff, is another aspect of the invention. This is done in such a manner as to keep the fertilizer, the diatom, the artemia, the shrimp and other food which may be added, in proper balance in a self cleansing arrangement. Sea water introduced will bring in nutrients such as plankton, with appropriate filtration to exclude predatory creatures and conditions tending to produce them.

By appropriate selection of species, with regard to spawning habits and growth rates, and by cyclical control of food materials and their culture, a balance is maintained which keeps the system sanitary and free of serious contamination, resulting in rapid and efficient production of marketable shrimp, in minimum time and with optimum continuity. Nutrient salts for promoting growth of plankton and other shrimp food are added in suitable quantities and at appropriate stages, to keep the food supply in balance with growth of the shrimp.

DESCRIPTION OF THE PREFERRED EMBODIMENT

A. The selection of a site

Generally penaeid shrimp spawn abundantly in subtropical and tropical sea areas. Therefore, in order to obtain mass production of shrimp by artificial cultivation, it is desirable to choose a site which meets the following conditions:

(1) Sea coast or bay area in subtropical and/or tropical regions where the normal water temperature is more than about 15° C. in winter.

(2) Areas where there are no hurricanes, or at least areas which do not suffer severely and periodically from hurricanes.

(3) Sites where there are fishing harbors with some already existing commercial shrimping activities, to provide a source of matured female shrimp with eggs for the hatchery. This shrimping activity which is essential for start-up, preferably should be continuous for a period of 4 to 5 months or more during the year.

(4) In cases where there are no current shrimping activities as mentioned in 3 above, the site at least should be in an area within several hours' reach of places where the matured female shrimp can be obtained in quantity and transported in vehicles equipped with live-wells to keep the mother shrimp in good condition during transportation to the spawning site.

B. Selection of species for cultivation

Figure 1:
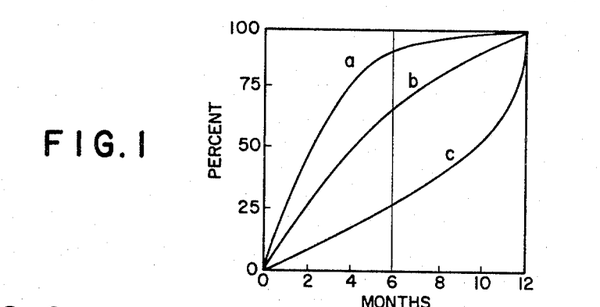
FIG. 1 is a diagram showing growth rates of three typical sub-species of shrimp of the more general species penaeid.
Figure 2A:
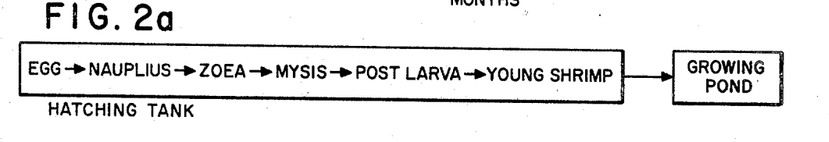
FIG. 2a to 2j are diagrams of typical shrimp cultivation tank and pond systems suitable for use in the process of the present invention.
Figure 2B:
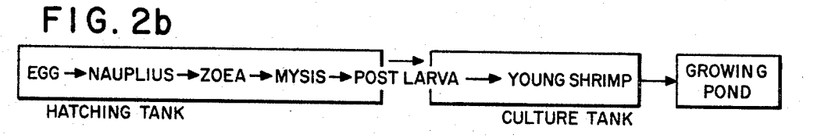
Figure 2C:
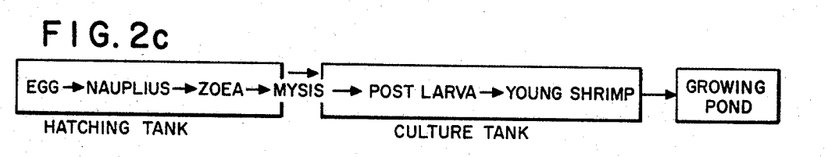
Figure 2D:
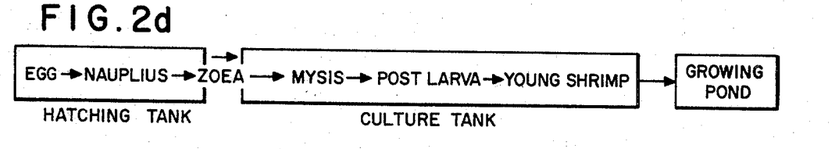
Figure 2E:
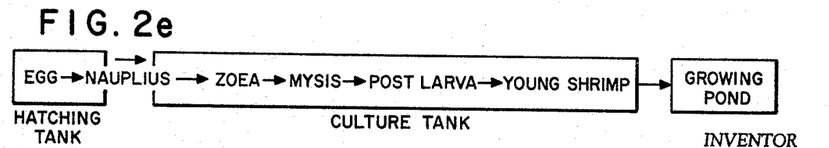
Figure 2F:
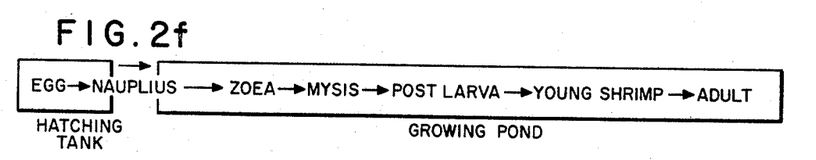
Figure 2G:
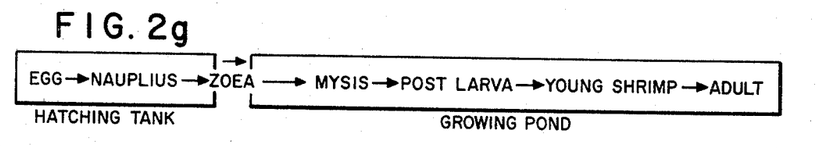
Figure 2H:
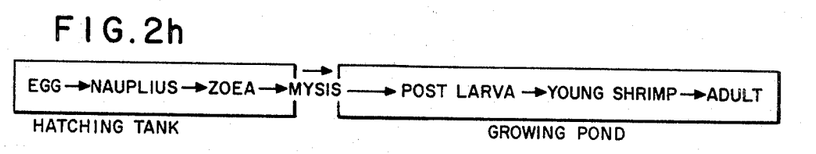
Figure 2I:
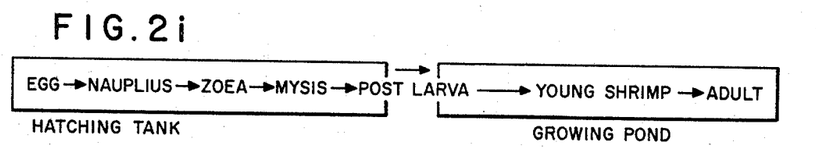
Figure 2J:
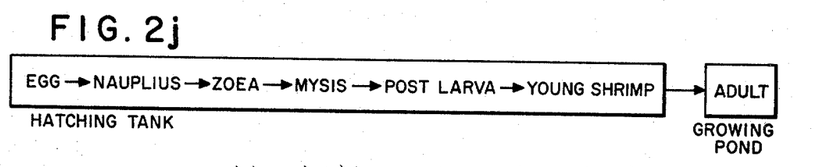

Generally the life span of the penaeid shrimp, except in few species, is about one year. The rate of growth and the periods of sawning of various species can be roughly classified as described below:

(1) Pattern of the rate of growth (see Rate of Growth as illustrated in FIG. 1):

(a) One species may reach nearly full size within the first six months, thereafter the growth may stop or become very slow. Example: *Penaeus orientalis*.

(b) A species which has substantially continuous growth from young to adult size. Example: *Penaeus japonicus*.

(c) A species which grows rather slowly during the younger period and thereafter, as it nears maturity, the growth rate increases. Example: *Penaeopsis akayebi*.

(2) Type classification by duration of spawning period:

(d) Extreme cases of longer duration, e.g. more than 8 months. Example: *Penaeus duorarum* (pink shrimp).

(e) Four to five months spawning period. Example: *Penaeus japonicus*.

(f) Two to three months (short) spawning period. Example: *Penaeus orientalis*.

For the purpose of efficient cultivation, the species of penaeid shrimp should be selected by combining characteristics of rapid growth, (a), (b), with suitable spawning seasons, (d), (e) or (f). By suitable selection and sequencing of cultivation stages, to be described below, it is possible to produce substantially continuous quantities of shrimp weighing as much as 40 to 50 grams each which will grow within a 6 month period to these sizes. For continuous production, instead of limiting cultivation to a single particular species, cultivation of two or three species normally may be preferable.

C. Cultivation of shrimp from egg to young stage (1) Egg through nauplius stage.—It is preferable to have concrete structure or the equivalent material for the spawning and hatching tank. The size of the hatching tank may vary considerably, according to the scale of operation and the availability of matured female shrimp. However, in general the larger practical sizes are better. Suitable standard sizes for hatching tanks are, for example:

(1) 10 m. x 10 m. x 1.5 m. (depth), i.e. with bottom area 100 m.$^2$.

(2) 50 m. x 10 m. x 2 m. (depth), i.e., bottom area 500 m.$^2$.

Hatching tanks of sizes smaller than (1) or larger than (2) or between the sizes of (1) and (2) can be used, if desired.

For a hatching tank, size (2), spawning and hatching data are approximately as follows:

The number of female shrimp per tank: 1000.

The spawning rate of the female shrimp, average about 50%.

Average number of the eggs per female shrimp, about 500,000.

Hatching rate: about 50%.

Resulting nauplii: about 125,000,000.

In an operation producing a new supply of nauplii once in every three three days over a period of five months, the resulting total nauplii produced in one hatching tank will be approximately 6,250,000,000.

The inside of the transportation truck or other vehicle used for bringing the female shrimp to the spawning or hatching site should be maintained at a temperature of about 20° C. and the water tank which is inside the vehicle should also be aerated.

A water temperature between about 25° C. and 30° C. is the most suitable for hatching of shrimp. However, it is possible to hatch shrimp at temperature inside the hatching tank reaches more than 30° C., a protective covering to reduce sun radiation to prevent further rise of temperature should be used.

A sufficient amount of aeration must be provided in the hatching tank to prevent oxygen deficiency and to procide water agitation. A Roots type blower pump of about 5 HP will give sufficient aeration to provide for about 10 tanks of the 10 m. x 10 m. x 2 m. size.

A salinity of about 2.7% (27 parts salt per 1000 by weight) to about 3.5% is the most suitable range for raising the shrimp. After the mysis stage, however, the larvae will have a favorable growth in water of less than 2.7% or more than 3.5% salinity.

Since spawning usually occurs during the night, the placement of the female shrimp in the hatching tank should be done during the day. Immediately after spawning is completed the female shrimp should be removed from the hatching tank.

The egg membrane (outer surface) of the shrimp egg is of phlegmatic or tacky nature and surrounding particles of foreign matter tend to cling to it. Due to such adherent particles, water containing considerably suspended matter thus tends to suffocate the egg and to cause a reduction of the hatching rate. Therefore, the seawater normally used for the hatching tank should be filtered, making it as free as possible of foreign particles. The filtration required will depend somewhat on the condition of the seawater adjacent to the hatching site. In order to determine the quality of seawater suitable for hatching tank and culture tank, the seawater is filtered through 80–100 mesh (per inch) net of synthetic woven fabric and the hatching rate is tested:

Type A, seawater: 50% or more, hatching rate.
Type B, seawater: 30–50%, hatching rate.
Type C, seawater: 30% or less, hatching rate.

When seawater is designated type A, with 50% or more hatching rate, the 80–100 mesh filter can be used for both the hatching and the culture tank. When the water is type B, additional filtering material, glass wool or a sand bed, is recommended. In both types A and B, the structure of the hatching tank and culture tank can be placed in the growing pond, using a synthetic fiber woven canvas type material for easy assembly and disassembly. When seawater for the hatching tank is type C, it must be filtered through a bed of fine sand one meter thick or equivalent material. In this case the structure of hatching tank should be a permanent installation.

When water temperature is more than 25° C. eggs normally will hatch after about 14 hours of incubation. After hatching, the nauplii moult 6 times within 36 hours before they metamorphose to zoeal larvae. Several hours after hatching, the nauplii can be transferred to an adjoining culture tank for the development of the zoed and later stages. Also, the same hatching tank can be used, if desired. Variations using hatching tanks, culture tanks, and growing ponds, will be explained further below, as various combinations of the culture method are possible.

(2) Raising larvae up to the zoea stage.—When the seawater adjacent to the hatching site is type A or B, the seawater for the culture tank will be filtered through an 80–100 mesh (per inch) cloth net.

A culture tank of size 50 m. x 10 m. x 2 m. (depth) is quite satisfactory but can be varied. According to the conditions of the cultivation site, a larger tank than mentioned above or a smaller one can be used. The structure material for walling or suspension in the culture tank can be of canvas type, preferably woven of synthetic fibers such as poly-propylene or poly-ethylene which will not deteriorate readily in sea water, so that it can be constructed in the growing pond. Such a structure can be assembled and easily disassembled after use in the growing pond.

The primary food for use during zoea stage larvae is planktonic diatom. The larvae in this stage have no reflex to swim toward food but must wait until, by chance, suitable food comes to the larvae's mouth; therefore, a sufficient density or concentration of the diatomaceous food must be present in the culture tank. Continuous agitation of the water by aeration also assists in bringing the food to the larvae's mouth.

The incoming seawater is always filtered at least through an 80–100 mesh net which is small enough to exclude not only small fishes which would prey on the shrimp larvae, but also to exclude fish roe which would later hatch into predatory fish. At the same time, the filter preferably should let diatoms in natural seawater enter into the tank.

The natural seawater always contains diatoms of appropriate types. The following lists the species of diatoms found or introduced in a typical operation. (The species may vary from month to month.)

SPECIES OF DIATOM IN THE CULTURE TANK (Middle of September 1966)

(1) *Coscinodiscus wailesii* Gran and Angst
   *Nitzschia seriata* Cl.
(2) *Actinocyclus octonarius* Ehr.
   *Coscinodiscus asteromphalus* Ehr.
   *Coscinodiscus eccentricus* Ehr.
   *Coscinodiscus gigas* Ehr.
   *Nitzschia closterium* (Ehr.) W. Sm.
   *Rhizosolenia scrubsolei* Cl.
   *Skeletonema costatum* (Grev.) Cl.
(3) *Achanthes longipes* Agardh
   *Amphora coffaeiformis* (Ag.) Kutz.
   *Amphora quadrata* Breb.
   *Bacteriastrum hyalinlum* Lauder
   *Cocconeis pseudomarginata* Gregory
   *Cocconeis scutellum* Ehr.
   *Coscinodiscus curvatulus* Grun.
   *Coscinodiscus lineatus* Ehr.
   *Coscinodiscus radiatus* Ehr.
   *Cyclotella striata* (Kutz.) Grun.
   *Ditylum brightwellii* (West) Grun.
   *Guinardia flaccida* (Castr.) H. Per.
   *Nitzschia constricta* (Greg.) Grun.
   *Paralia sulcata* (Ehr.) Cl.
   *Pleurosigma aestaurii* W. Sm.
   *Rhizosolenia calcar-avis* Schultze
   *Rhizosolenia setigera* Brightwell
   *Stephanopyxis turris* (Grev. and Arn.) Ralfs.
   *Streptotheca thamensis* Schrub.
   *Synedra formosa* Hantzsch
   *Thalassionema nitzschioides* Grun.

(1, C; 2, +; 3, R)

The preferred nutrient salts and the quantities per ton of seawater per day need for propagation of diatoms are given as follows:

$KNO_3$ (potassium nitrate), 50 gr.
$K_3PO_4$ (potassium phosphate), 5 gr. or ($Na_2HPO_4$ sodium acid phosphate), 5 gr.)
$Na_2SiO_4$ (water glass), 2.5 gr.

The above dosage of the nutrient salts should start one day prior to the time when the nauplii have metamorphosed to the zoea stage. ($Na_2SiO_4$ can be eliminated in some cases.)

Roofing usually is not necessary in a culture tank where the zoea stage larvae are contained. Direct sunshine is acceptable. By providing sufficient aeration, sufficient diatoms of vitality can be produced, because the continuous circulation between top layer of water and bottom layer of water is maintained, giving the chance to all the diatoms to absorb the sun's energy. The diatoms with good vitality are the most suitable feed for the larvae in the zoea stage. As the propagation of diatom increases, the water in the culture tank turns brownish in color. In so doing it provides some protection for the zoea stage larvae against the injury they might otherwise receive from direct sunshine. Due to reduced pigmentation on the surface of the body of larvae in the zoea stage, they tend otherwise to be damaged by the direct rays of the sun. But as a result of the propagation of diatoms, in water depth 10 cm. or less from the surface, the sun's rays are absorbed enough that ample protection is provided for the zoea stage larvae.

When the water temperature is more than 25° C., the zoeal larvae will have metamorphosed within 3 to 4 days to the mysis stage after moulting three times.

The construction and the materials which will be used for the culture tank for rearing the shrimp from the zoea stage to the young shrimp stage may differ considerably, according to the scale of the operation, availability of materials, geological and geographical conditions, etc.

As suggested above, the same hatching tank, preferably a structure of concrete, can be used for rearing the shrimp all the way from egg to young shrimp without changing the tank. For larger scale operations, however, the shrimp will be transferred to larger vessels from time to time.

In larger scale operations, construction of numerous hatching tanks, e.g. concrete structures, adds considerably to the expense and takes additional space. Consequently, structures of synthetic material, e.g. canvas types of culture tanks separated merely by partitions within a larger growing pond often provide a more versatile and efficient utilization of structural materials and space for raising of the shrimp all the way from zoea to young shrimp stages.

(3) The culture of mysis stage larvae.—When zoeal larvae pass to the mysis stage, the characteristics of their diet changes and they begin to take and require animal type food. But during this stage the larvae also feed on some portions of plant type planktons. The nauplii of the artemia are a particularly suitable food for this stage of larvae development, being a good animal type of food. Copepoda which has infiltrated from the natural sea water to the culture tank through the filter also will propagate in the tank and is also a suitable food for larvae in the mysis stage.

At this stage a positive reflex on the part of the larvae to take the food by its own power is not fully developed, therefore an abundant density of foods must be present substantially continuously in the culture tank.

During the period of mysis stage, artemia in quantities of 50 kg. per culture tank of the standard size 50 m. x 10 m. x 2 m., should be supplied. Calculation is based on the following data:

Number of penaeid shrimp nauplii in a standard culture tank, 25,000,000.

Zoeal larvae, 22,500,000, based on survival rate, 90%.
Mysis larvae, 15,750,000, based on survival rate, 70%.
Thus, assuming 15,750,000 mysis larvae in a standard culture tank, and assuming the following:
San Francisco product, Artemia Eggs, 1 gr.=570,000 eggs.
Canada product, Artemia Eggs, 1 gr.=280,000 eggs.

In taking San Francisco products as an example, and assuming a hatching rate of 50%, with 50 kilograms of artemia eggs in a tank, 1,425,000,000 artemia nauplii can be obtained. See below under H, the method of propagation of artemia.

A single larva of mysis stage usually consumes about 30 artemia nauplii per day. However, the culture tank also contains many diatoms, Copepoda, and other small animal and vegetable type plankton which are continuously being propagated and which provide supplemental food for the shrimp larvae. Any excess nauplii of artemia left uneaten by the mysis larvae can be left in the tank. They can be grown to full size and used as food for later successive stages of feeding.

When the artemia nauplii are given as food for the mysis larvae, the artemia eggs should be placed in the culture tank while the larvae are in zoea III stage. This is because the artemia takes about 18 hours to hatch, assuming that the water temperature is 25° C. or more. Mysis larvae will moult 3 times during their 3-day period and then will metamorphose to the postlarval stage.

(4) Raising of larvae from postlarval to young shrimp stage.—For the first four days after the larvae enter into postlarval stage cannibalism is at its maximum peak. The larvae will consume each other to a considerable extent if adequate food supplies of other kinds are not available. This must be minimized.

Some species (for example, *Penaeus japonicus*) take animal type food exclusively when they enter into the postlarval stage, but some other species (for example, *Penaeus monodon*) take a major portion of animal type food and a minor portion of plant type food. In the former case, 50 larvae of artemia which are grown 4 to 5 days old should be fed to each postlarva.

Usually, after about four days after entering into the postlarval stage, the habit of cannibalism subsides gradually. After one week of the postlarval stage the larvae acquire the habit of living and feeding on the bottom of the pond or tank.

Food for the larvae (after four days in the postlarval stage) consists largely of clam meat, (invertebrate) and ground fish meat if such foods are easily obtainable, along with the artemia. However, artemia is still probably the most suitable food, not only as nutrient for the shrimp but also in order to keep the water in the culture tank clean. In case the food consists largely of clam meat and ground fish meat, caution must be taken that the water in the culture tank is kept reasonably free from contamination by excessive remains of food particles. One week after the larvae are in the postlarval stage, about one-fifth of the water in the culture tank must be exchanged with fresh seawater. However, it will not be necessary, as a rule, to change the water in the culture tank if a sufficient amount of aeration is applied and where the food for the postlarval larvae consists entirely of live food such as artemia. Fifteen days after the postlarval stage, the weight of an individual larva reaches 0.02 gr. At this stage it is usually called the "Young Shrimp" stage instead of "postlarva." During this "Young Shrimp" stage the shrimp are ready to be placed in growing ponds. Prior to the releasing of the young shrimp into the growing ponds, an adequate number of artemia should be placed therein. The artemia will multiply by parthenogenesis in the growing pond, provided they have had about one month to propagate. These then will provide adequate and ready live food for the young shrimp for the first month's rearing without adding any food other than that already in or growing in the pond.

When a considerably large growing pond is used, an area fenced in by a net in the growing pond should be used for 15 to 20 days, maintaining a density of about 500 young shrimp per square meter of area. The food at this stage will be clam meat, ground fish and artemia. After the shrimp have been in the young shrimp culture for about a month, they attain a size of about 0.1 to 0.5 grams each. They then are ready for the growing pond.

Arrangements of tanks and uses of tanks are shown in FIGS. 2a to 2j, inclusive.

D. Structure and method of operation of growing pond and input and output of water The areas of growing ponds will be limited by the geological conditions of the area; however, the size of a pond should be at least 50,000 m.$^2$. It is preferable to have a depth of more than 2 m. for growing ponds. The 1.5 m. depth in the growing pond is the critical lower limit. If the water is less than 1.5 m. depth enough of the sun's rays penetrate to the bottom of the pond to allow growth of types of seaweed which spreads like carpet, covering the bottom of the pond. This is undesirable. Such seaweed prevents the shrimp from being able to reach their hiding places in sand. It also prevents fresh seawater from contacting the bottom of the pond thereby causing the generation of $H_2S$ which is undesirable. It produces a reduction layer on the bottom which consumes oxygen needed by the shrimp. The $H_2S$ is poisonous to the shrimp. A water depth of 1.5 m. or more in the growing pond prevents the growth of these seaweeds and eliminates their undesirable effects. A narrow, shallow pond tends to be affected too much by changes in weather and also may frequently develop an oxygen deficiency unless given close attention.

When the coastal line provides a suitable lagoon or bay area for use in shrimp growing, such an area can be sectioned into ponds by simply putting in screen partitions. If such water areas are not available for growing ponds, a simple excavation can provide a suitable site. The edges of the excavated pond should be sloped gradually. Use of concrete walls normally will not be necessary.

On the sloped side areas and in some part of the bottom areas of the pond perennial seawater plants such as *Zostela marina* are planted unless already present. The planted area should be more than half the total area of the growing pond. The presence of vertically growing water plants in the pond not only tends to keep the water clean but also promotes growth of marine foods which are favorable for the penaeid shrimp such as small crustacea, Nematoda, Annelida, etc. If such plants are not available, however, they are not absolutely essential.

The filling and draining of the water in the growing pond preferably will be done by tidal fluctuation. Therefore, at least 2 meters of tidal fluctuation at the spring tide is desirable where available. However, this is not an absolute necessity for operation of the growing pond. Where the tidal fluctuation is less than about one meter, the 2 meter depth of the pond can still be filled by the tide, but of course, the pond cannot be completely drained by mere use of ebb tide. In this case, pumps must be used to dry the ponds. The drying of such ponds is required, however, only once or twice a year, in most cases.

The daily exchange of water in the pond usually can be limited to a small amount. The necessary generation of a flowing current inside the pond and the supply of oxygen by introducing fresh sea water from the open sea usually can be limited to relatively small area of the pond. This assumes that there is reasonably good circulation in the pond.

Figure 3:
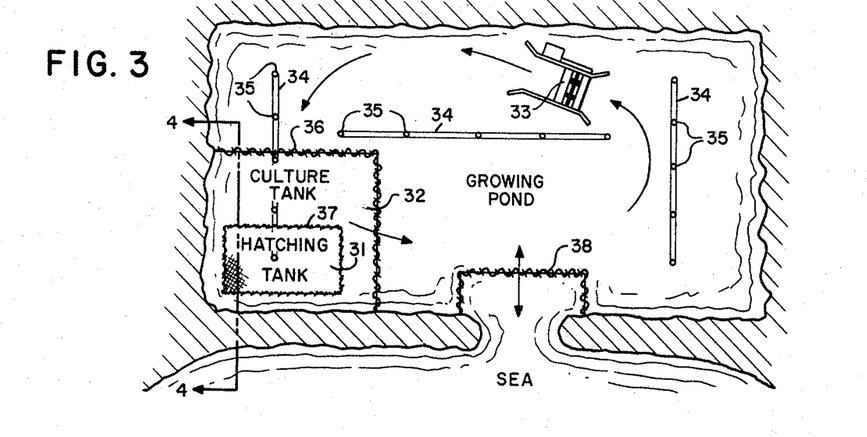
FIG. 3 shows diagrammatically a suitable arrangement for a growing pond.

It is necessary to have a continuous gentle current of water movement in the pond to maintain good capacity per unit area for raising shrimp. To generate the water current, a conventional mechanical impeller 33 or pump will serve. A suitable drive motor is provided.

Where water temperature is higher, as in tropical and subtropical waters, a tendency towards oxygen deficiency in the pond water may exist. To counter-balance such deficiency of oxygen, a suitable apparatus for aeration must be provided. A suggested arrangement is shown in FIG. 3. Simple air pipes 34 are provided with spaced outlets 35 and an air pump (not shown).

The oxygen content in the pond water should be maintained (even at night) so that it does not drop below 2.5 cc./l. A temporary drop of oxygen level to below 2 cc./l. will not induce the death of the shrimp but it cannot be tolerated for any length of time.

Referring to the drawings in some detail, FIG. 1 shows how certain species of shrimp *a* and *b*, mentioned in further detail, grow rapidly in early stages whereas another species *c* grows more slowly and is less desirable.

FIG. 2a to 2j show various times for transferring the shrimp from hatching tank at late stage to growing pond (2a and 2j) or from hatching tank to culture tank to growing pond at various stages (2b to 2e) or from hatching tank to growing pond at various stages (2f to 2i).

FIG. 3 shows a preferred arrangement where water can be brought directly from the ocean. A large growing pond is connected by an inlet to the sea and contains a culture tank 32 with a hatching tank 31 suspended in the culture tank.

Special screening 36, 37 and 38 is necessary for the water inlets and outlets. Screen 38 is not as necessary for preventing the shrimp from escaping as it is to prevent the entrance of harmful fish into the pond which feed on the shrimp, or which, even if they do not eat the shrimp, may devour the food required by the shrimp and also consume the oxygen in the pond water. Escape of shrimp from the pond can be prevented by using different mesh screens to match the size of the shrimp. However, in tropical and subtropical waters, there will be generally a constant spawning of a variety of fishes. Therefore, the screen at the water inlet gates must have a sufficiently small or fine mesh all year around to prevent entrance of fish eggs and/or baby fish into the pond. Thus, special caution must be taken to screen the area surrounding the water gates, preferably with a screen not larger than 80 mesh. A woven fabric of threads which are not damaged by long exposure to water or weather is preferred. Synthetic fibres such as nylon, Dacron® or polyolefins are satisfactory.

Figure 4:
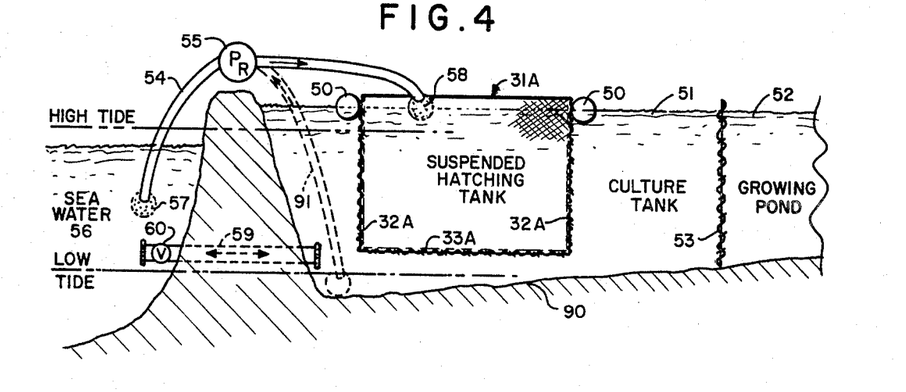
FIG. 4 is an enlarged vertical sectional view taken substantially along the line 4—4 of FIG. 3.

FIG. 4 shows in vertical section a system like that of FIG. 3. A hatching tank 31A is suspended by floats in the larger tank 51. The hatching tank has side walls 32A and a bottom 33A formed of woven fabric of weather resistant synthetic fibres such as nylon, Dacron®, polyethylene or polypropylene and the like. It is finely woven material which is substantially watertight so as to retain the tiny newly hatched shrimp nauplii and the nutrient salt therein. The floats 50 are buoyant balls or cylinders, etc., of hollow glass, cork, balsa wood or the equivalent. Culture tank 51 in which the hatching tank is suspended is separated from the growing pond 52 by similiar screening material 53. A conduit 54 having a pump 55 connects the tank or the pond 51 to the sea 56 and is provided with one or more filters or screens 57, 58. A gravity flow conduit 59 provided with a valve 60 is provided also so that water can be drawn in or out under suitable tidal conditions. The pond bottom preferably slopes towards the conduit 59 to provide drainage when desired, provided the tide is suitable. The hose or conduit 91 connected to pump 55 can be used to add or remove water to or from any of the tanks or pond.

Figure 5:
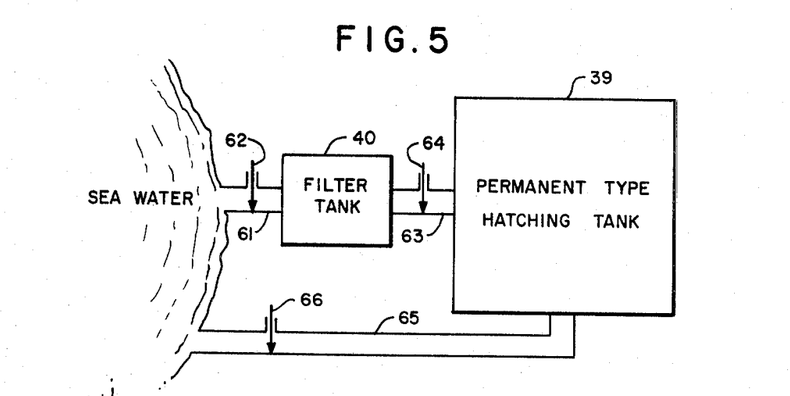
FIG. 5 shows a modification for filtering saline water when it is excessively contaminated.

FIG. 5 shows an arrangement which is needed when the sea water is highly contaminated. A sand-filled filter tank 40 is so arranged that the incoming water must pass through a bed of sand about 1 meter or more in thickness, to remove contaminating material. This will be used when the screens 57, 58, FIG. 4, are inadequate. Water flows in from the sea through a line 61 under control of valve or gate 62 and from the filter tank it goes through a line 63 through gate or valve 64 to the hatching tank 39. A return line 65 from hatching tank to the sea is provided with a gate or valve 66. Suitable pump means may be included in one or more of the flow lines, if needed.

Figure 6:
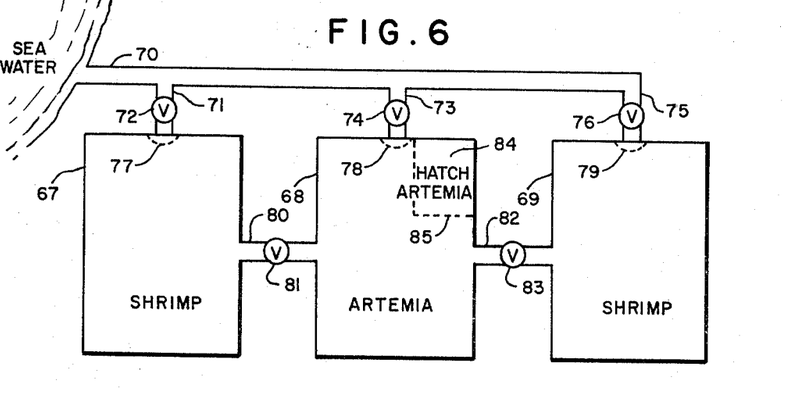
FIG. 6 shows a preferred combination of ponds for growing shrimp and growing artemia to feed them.

FIG. 6 shows a preferred arrangement of an artemia pond 68 between two shrimp growing ponds 67 and 69. As pointed out elsewhere herein, one artemia pond, properly operated, can supply food for two shrimp growing ponds of the same size. A conduit or acqueduct 70 brings in water from the sea and the water is distributed as needed through branch lines 71, 73, 75 under control, respectively, of valves 72, 74, 76. Pump means, not shown, may be used if and when needed. Filters or screens of fine mesh, like those described above, are used at 77, 78 and 79. Water can flow directly from one pond to another, when desired, through lines 80, 82, under control of valves 81 and 93. A hatching tank for the artemia is shown at 84, having walls 85 like those of the hatching tank 31A in FIG. 4, as already described. Lines 80 and 82 may be omitted when the artemia are to be transferred by other means, e.g. by dipping them out with fine mesh dippers, etc.

Hence a unit of three ponds, two for growing shrimp and one artemia pond associated with each pair of shrimp ponds, is a preferred arrangement. Such units may be repeated, using as many triple pond sets as needed for the desired total capacity or total pond area.

It will be understood also that the term "pond" includes tanks and other enclosures containing water for cultivation of shrimp and/or of foods for shrimp. Thus, the invention contemplates use of enclosures entirely surrounded by sea water on all sides and also includes suspended or buoyant tanks or systems, like the tank 31A of FIG. 4. Whole "ponds" and pond systems can thus be suspended in sea water, according to this concept of the invention.

E. Relation between penaeid shrimp and the pond bottom condition

Generally, the penaeid shrimp, after it reaches young shrimp stage, stays at the bottom of the sea during the day and is active during the night. Consequently, there is a close relationship between the habits of penaeid shrimp and natural sea bottom conditions. The same is true of the culture pond condition. There are four major types of shrimp species in relation to their bottom condition habits, as follows:

Type 1 stays under relatively clean sand and when the sand becomes polluted growth of the shrimp is imperiled. Example: *Penaeus japonicus*.

Type 2 stays under muddy sand. Example: *Penaeus orientalis*.

Type 3 buries half of its body regardless of the bottom condition. Example: *Penaeopsis monoceros*.

Type 4 does not bury itself under the sand. Example: *Penaeus monodon*.

Of the four types of species mentioned, the species of Type 1 must be provided with a clean sand bottom for its cultivation. It is not necessary to keep the entire bottom area clean, but at least one fifth of the entire bottom area must be kept clean. Technically it is not desirable to clean the sand of the entire pond and it often is impracticable in any case.

In cultivation of Types 2, 3 and 4 of shrimp listed, it will not be necessary to take the bottom conditions so much into consideration. However, generation of $H_2S$ by pollution on the bottom must be prevented.

F. Growing pond feeding (I)

Feeding is the most difficult problem, not only in the cultivation of the penaeid shrimp but generally in any cultivation of shrimp, fish, and the like. Obviously, any shrimp cultivation method can not succeed without solving the feeding problem.

Penaeid shrimp belong to the Invertebrata and their digestive organs are extremely simple; therefore food for the shrimp must differ accordingly from the food which is used for raising vertebrate animals.

Penaeid shrimp are carnivorous; therefore their food must consist to a large degree of animal protein. For economic reasons, those foods which can be used for human consumption and foods for important domestic animal consumption should be avoided as food for the shrimp culture.

In considering the above points, problems of feeding in the growing pond must be solved. Hence basic experiments were undertaken to provide answers to the problems of feeding shrimp in artificial culture.

Experiment I

*Penaeus japonicus* (referred to hereinafter as Kuruma Shrimp) generally do not take food when the water temperature goes down to less than about 12° C. When the water temperature reaches more than 12° C. they will start eating a little. Under such cool water conditions, feeding fish to Kuruma shrimp causes an increase in mortality, even when fresh fish are fed. In such cases feeding of neck clam in place of fish meat stops the rise of mortality rate. There is not much difference in aminoacids content between fish meat protein and clam meat proteins. However, the major difference between them will be found in the types of blood included in fish meat and clam meat. The red blood corpuscles of the vertabrate contain hemoglobin. The coloring matter in the blood of Invertebrata, on the other hand, especially in Mollusea-clams and Arthropoda-shrimp, which belong to this phylum, consists of hemocyanin.

When water temperature and the vitality of shrimp are low, food which contains hemoglobin cannot be well digested by the shrimp whose circulating fluid contains hemocyanin. Hemoglobin seems to be an incompatible food and is not satisfactorily absorbed as a nutrient for shrimp at lower temperatures.

When the water temperature increases to 17–18° C., however, and as the shrimp become more active, then the above mentioned problem disappears.

Ark shell is an exception among shell fish and has red blood cells or hemoglobin. When ark shell and neck clam are placed in the same experimental pond, the majority of the shrimp fed on neck clam but only a few fed on ark shell, even when the water temperature was over 20° C. and the activity of the shrimp was vigorous. Only when neck clam was taken out of the food supply did all the shrimp feed on the ark shell. This, however, did not appear to cause any mortality increase.

This experiment indicates that food of invertabrate origin is superior to that of vertebrate origin for the shrimp, more or less regardless of water temperature (within a reasonable range) or the vigor or activity of Kuruma shrimp.

Experiment II

When the water temperature of the pond rises to more than 30° C., for as much as four successive days, the shrimp tend to have low vitality and a slight increase in mortality rate can be observed. Also the growth rate will be lowered, even when crushed neck clam meat is fed.

Under these conditions, the feeding of live Isopoda, Amphipoda, or artemia soon restores the vitality of the shrimp.

The failure to restore vitality of the shrimp by feeding of neck clam when the water temperature is more than 30° C. apparently is not a question of suitability of food, but is probably due to loss of freshness of the food because of high water temperature.

This experiment indicates that the live-feeding of invertebrate origin is preferable, even when the water temperature in the pond increases to more than 30° C.

Experiment III.—Comparative experiments with a variety of foods

In order to determine differences in growth and survival rates by feeding a variety of foods, the following experiments were conducted, testing the following foods:

(1) Frozen small shrimp.
(2) Crushed neck clam meat which was washed to separate the shell and meat.
(3) Crushed neck clam meat without washing before separation of shell and meat.
(4) A mixture of 80% frozen small shrimp and 20% by weight of crushed neck clam.

Experiments III, 1 to 4, were conducted in a tank having dimensions of 10 m. x 10 m. x 2 m. (depth) and of concrete structure. One tenth of the total bottom area of the tank was covered with sand of 10 cm. thickness, and a sufficient amount of aeration to keep a good oxygen content was applied. Food portions given were larger than the regular amounts normally consumed by the shrimp.

The young shrimp which were used in the experiment were all offspring from the same female shrimp. The average weight of the young shrimp was 0.11 gr. at the beginning of the experiments. Each experimental tank contained 4,000 young shrimp; therefore the total weight of the young shrimp in each tank was about 0.44 kg. with the young shrimp distributed about 40 per square meter.

The experiments were started on June 10, 1966, and completed on November 9, 1966 (five months). The data are summarized in Table I and water temperatures are given in Chart 1.

TABLE I.—COMPARATIVE EXPERIMENTS WITH A VARIETY OF FOODS

TANK (1) FROZEN SMALL SHRIMP

|  | After— | | | | | Remarks |
|---|---|---|---|---|---|---|
|  | 1 Month | 2 Months | 3 Months | 4 Months | 5 Months |  |
| No. of shrimp | 3,320 | 2,640 | 1,960 | 1,280 | 670 |  |
| Average Wt. (gr) | 0.75 | 4.15 | 10.6 | 14.7 | 22.6 |  |
| Total Wt. (kg) | 2.49 | 10.98 | 20.78 | 18.82 | 15.2 | 152 gr./m.².* |
| Survival rate | 83.0 | 66.9 | 49.0 | 32.0 | 16.8 |  |
| Wt. Coefficient | 27.3 | 23.6 | 25.5 |  | 51.4.** |  |

TANK (2) CRUSHED NECK CLAM—WASHED

| No. of shrimp | 3,864 | 3,732 | 3,600 | 3,468 | 3,338 |  |
|---|---|---|---|---|---|---|
| Average Wt. (gr) | 1.69 | 7.24 | 14.3 | 17.9 | 22.9 |  |
| Total Wt. (kg) | 6.53 | 27.0 | 51.5 | 62.1 | 76.6 | 766 gr./m.².* |
| Survival Rate | 96.6 | 93.3 | 90.0 | 86.7 | 83.5 |  |
| Wt. Coefficient | 9.18 | 9.8 | 12.4 | 24.6 | 13.3 | 13.3.** |

TANK (3) CRUSHED NECK CLAM—UNWASHED

| No. of shrimp | 3,872 | 3,748 | 3,620 | 3,492 | 3,363 |  |
|---|---|---|---|---|---|---|
| Average Wt. (gr.) | 2.02 | 7.78 | 14.9 | 19.5 | 24.4 |  |
| Total Wt. (kg.) | 7.82 | 29.2 | 53.9 | 68.1 | 82.3 | 823 gr./m.².* |
| Survival Rate | 96.8 | 93.7 | 90.5 | 87.3 | 84.1 |  |
| Wt. coefficient | 6.44 | 11.1 | 13.3 | 18.4 | 11.9 | 12.7.** |

TANK (4) FROZEN SMALL SHRIMP, 80% AND NECK CLAM, 20%

| No. of shrimp | 3,872 | 3,744 | 3,612 | 3,484 | 3,353 |  |
|---|---|---|---|---|---|---|
| Average Wt. (gr.) | 1.61 | 7.92 | 14.55 | 20.4 | 26.4 |  |
| Total Wt. | 6.23 | 29.6 | 52.6 | 71.1 | 88.2 | 882 gr./m.².* |
| Survival Rate | 98.8 | 93.5 | 90.3 | 87.1 | 83.8 |  |
| Wt. Coefficient | 9.39 | 8.6 | 12.5 | 14.1 | 9.64 | 11.0.** |

*Total shrimp production in five months per unit area.
**Food consumption per gram of shrimp during five months.

TABLE II.—MAXIMUM CULTIVATION DENSITY OF SHRIMP PER UNIT AREA

TANK (5) YOUNG SHRIMP 150/m.²

|  | After— | | | | | Remarks |
|---|---|---|---|---|---|---|
|  | 1 Month | 2 Months | 3 Months | 4 Months | 5 Months |  |
| No. of shrimp | 15,000 | 15,000 | 15,000 | 15,000 | 14,841 |  |
| Average Wt. (gr.) | 1.2 | 4.8 | 8.6 | 13.6 | 16.9 |  |
| Total Wt. (kg.) | 18.0 | 70.5 | 129.0 | 204.0 | 250.0 | 2.5 kg./m.².* |
| Survival Rate | 100 | 100 | 100 | 100 | 98.9 |  |
| Wt. Coefficient | 6.8 | 10.2 | 14.7 | 10.4 | 12.2 |  |

TANK (6) YOUNG SHRIMP 280/m.²

| No. of Shrimp | 27,020 | 24,360 | 20,720 | 17,556 | 15,000 |  |
|---|---|---|---|---|---|---|
| Average Wt. (gr.) | 1.1 | 4.7 | 9.0 | 14.0 | 15.2 |  |
| Total Wt. (kg.) | 29.7 | 114.5 | 186.5 | 254.8 | 228.0 | 2.28 kg./m.².* |
| Survival Rate | 96.5 | 87.0 | 74.0 | 62.7 | 53.6 |  |
| Wt. Coefficient | 6.6 | 9.0 | 16.9 | 16.6 |  |  |

TANK (7) YOUNG SHRIMP 150/m.²

| No. of Shrimp | 13,995 | 13,500 | 13,005 | 12,510 | 12,100 |  |
|---|---|---|---|---|---|---|
| Average Wt. (gr.) | 1.6 | 6.1 | 12.0 | 17.0 | 20.8 |  |
| Total Wt. (kg.) | 22.4 | 82.4 | 156.1 | 213.0 | 252.0 | 2.52 kg./m.².* |
| Survival Rate | 93.3 | 90.0 | 86.7 | 83.7 | 80.7 |  |
| Wt. Coefficient | 6.0 | 9.6 | 11.9 | 14.4 | 13.6 |  |

*Total shrimp production in five months per unit area.

Through this experiment, Table I, some unexpected results were obtained from tanks 1 and 4.

The food used in tank 1 consisted of small frozen shrimp (invertebrate) which were thought to be suitable food for the shrimp. But the results were unexpectedly poor. Frozen food alone appears to be nutritiously inadequate. In this case, the shrimp became cannibalistic to compensate for the dificiency in nutrition and the resultant survival rate was only 16.8%. Tanks 2 and 3 both were fed with identical clam meat. Results were far suuperior to those in tank 1. However, in the case of tank 2, the clam meat was washed to separate the meat and the shell. Therefore, some of the soluble protein of the clam meat apparently was washed away, producing a lower quality food than that in tank 3. In tank 4, by using only 20% of freshly crushed clam meat and 80% of frozen small shrimp, results were better even than in tanks 2 and 3.

Experiment IV

The following experiments were conducted to determine the maximum cultivation density of Kuruma shrimp per unit area. The tanks used in this experiment were the same in dimensions as those in Experiment III. (10 m. x 10 m. x 2 m.)

The experiment was started on June 10, 1966, and completion was on Nov. 10, 1966.

The young shrimp used in these experiments were all offspring from the same female shrimp. The average weight of a young shrimp was 0.075 gr. to start. Sufficient amount of aeration was applied. Results were shown in Table II. They indicate that a concentration of 280 shrimp per square meter is too high.

The food for tanks 5 to 7 was 52% frozen small shrimp and 48% neck clam meat with shell.

The numbers and concentrations of young shrimp placed were as follows:

Tank 5—15,000 (150/m.²) total weight 1,125 kg.
Tank 6—28,000 (280/m.²) total weight 2,100 kg.
Tank 7—15,000 (150/m.²) total weight 1,125 kg.

Tanks 5 and 6 each had a double bottom structure over 1/10 of the total bottom area of the tank.

Tank 7 had no double bottom structure. One tenth of the total area consisted of a sand floor. The thickness of the sand floor was about 10 cm. in all tanks 5 to 7. Water temperature is indicated in Chart 2. Oxygen concentration (cc. per liter) is shown in Chart 3.

CHART 1.—WATER TEMPERATURE CHART BY TEN DAY PERIODS, EXPERIMENT III

| Time | June 2d | June 3d | July 1st | July 2d | July 3d | August 1st | August 2d | August 3d | September 1st | September 2d | September 3d | October 1st | October 2d | October 3d | November 1st | November 2d |
|---|---|---|---|---|---|---|---|---|---|---|---|---|---|---|---|---|
| 5 hours | 20.4 | 24.1 | 22.1 | 24.2 | 25.4 | 28.3 | 28.3 | 27.4 | 27.4 | 23.7 | 20.5 | 19.9 | 19.3 | 14.2 | 13.7 | 13.9 |
| 15 hours | 20.8 | 25.0 | 22.5 | 24.8 | 29.5 | 30.0 | 29.8 | 27.6 | 29.2 | 25.0 | 21.9 | 21.2 | 20.0 | 16.0 | 15.0 | 15.5 |

From June to July the measurement of temperature in the morning was done at 8:00 a.m. Outside of these dates the water temperature measurements were done at 5:00 a.m.

CHART 2.—WATER TEMPERATURE CHART, EXPERIMENT IV

| Time | June 2d | June 3d | July 1st | July 2d | July 3d | August 1st | August 2d | August 3d | September 1st | September 2d | September 3d | October 1st | October 2d | October 3d | November 1st |
|---|---|---|---|---|---|---|---|---|---|---|---|---|---|---|---|
| 5 hours | 20.7 | 24.7 | 22.2 | 22.6 | 28.4 | 29.1 | 28.8 | 27.7 | 28.3 | 23.6 | 20.4 | 19.5 | 19.1 | 15.2 | 13.2 |
| 15 hours | 21.8 | 28.0 | 23.5 | 26.6 | 30.6 | 30.6 | 30.2 | 29.2 | 29.6 | 25.1 | 21.8 | 21.4 | 20.3 | 17.1 | 13.8 |

CHART 3.—OXYGEN CONTENTS (cc./l.), EXPERIMENT IV

TANK (5)

| | June 3d | July 1st | July 2d | July 3d | August 1st | August 2d | August 3d | September 1st | September 2d | September 3d | October 1st | October 2d | October 3d | November 1st |
|---|---|---|---|---|---|---|---|---|---|---|---|---|---|---|
| 5 hours | 4.90 | 4.34 | 3.69 | 2.88 | 2.85 | 4.15 | 3.71 | 3.44 | 4.55 | 4.53 | 4.19 | 3.90 | 4.34 | 4.54 |
| 15 hours | 7.22 | 7.48 | 7.60 | 6.29 | 6.15 | 8.06 | 6.42 | 5.84 | 7.44 | 7.32 | 7.78 | 7.38 | 7.55 | 7.69 |
| 21 hours | 5.44 | 5.61 | 5.04 | 3.27 | 3.22 | 4.24 | 3.48 | 3.37 | 4.37 | 4.44 | 4.10 | 3.87 | 4.42 | 4.79 |

TANK (6)

| | June 3d | July 1st | July 2d | July 3d | August 1st | August 2d | August 3d | September 1st | September 2d | September 3d | October 1st | October 2d | October 3d | November 1st |
|---|---|---|---|---|---|---|---|---|---|---|---|---|---|---|
| 5 hours | 4.07 | 4.63 | 3.94 | 3.93 | 3.81 | 4.44 | 4.71 | 3.52 | 4.09 | 4.92 | 4.91 | 4.63 | 5.35 | 4.56 |
| 15 hours | 6.95 | 7.52 | 7.22 | 6.25 | 5.64 | 5.29 | 7.08 | 5.91 | 6.16 | 5.84 | 6.90 | 7.07 | 7.78 | 7.26 |
| 21 hours | 4.55 | 4.91 | 4.21 | 3.08 | 3.17 | 3.94 | 4.10 | 2.72 | 3.41 | 4.22 | 4.20 | 4.42 | 4.93 | 4.57 |

TANK (7)

| | June 3d | July 1st | July 2d | July 3d | August 1st | August 2d | August 3d | September 1st | September 2d | September 3d | October 1st | October 2d | October 3d | November 1st |
|---|---|---|---|---|---|---|---|---|---|---|---|---|---|---|
| 5 hours | 4.12 | 4.07 | 3.36 | 2.34 | 2.50 | 2.84 | 2.87 | 2.49 | 3.87 | 4.69 | 4.20 | 3.56 | 3.47 | 4.48 |
| 15 hours | 6.58 | 6.85 | 6.94 | 6.09 | 5.71 | 7.14 | 6.10 | 5.59 | 6.31 | 6.86 | 7.39 | 6.88 | 5.91 | 6.09 |
| 21 hours | 5.90 | 5.29 | 4.43 | 3.02 | 2.86 | 3.92 | 2.61 | 2.47 | 3.44 | 4.14 | 3.77 | 3.53 | 3.95 | 4.74 |

The findings in Experiment IV are as follows:

Tank 5 produced almost a 100% survival rate, (98.9%), even though a fairly high density of 150/m.$^2$ of the young shrimp was used.

Tank 7 produced an 80.7% survival rate. In Tank 6 the density of the young shrimp per unit area was 280/m.$^2$, therefore the survival rate was reduced to 53.6%, considerably inferior in survival rate to those of Tanks 5 and 7. That is to say, a good survival rate and a normal growth of shrimp can be obtained with a density of 150/m.$^2$ of young shrimp.

The production of 2.5 kg. of adult shrimp per square meter of pond area within a five-month cultivation period under the conditions shown indicates that it is probably possible to grow as much as 5 kg. of shrimp per square meter in tropical and subtropical waters annually.

As was indicated in Experiment II, the lowering of vitality and the reduction of growth rate under conditions of continuous maintenance of water temperature in the pond over 30° C. are inevitable. Therefore, in tropical and subtropical areas live-feeding for cultivation of the shrimp is of vital importance.

In the process of growing, Crustacea generally have to get through a number of moults. At the moulting period the tendency to cannibalism increases and a large number of shrimp are lost because of it.

However, as Experiments III and IV indicate, the tendency to cannibalism can be substantially prevented by providing the right quantity and quality of food for the shrimp, even though the shrimp are high in density.

As indicated in Experiment III (Tank 1), an overly sufficient quantity of food of unsuitable quality induces cannibalism among the shrimp and causes a low production rate. As indicated in Experiment IV (Tank 6), an overly high density of young shrimp also results in cannibalism and loss of production.

Thus cannibalism among shrimp can positively be prevented by controlled management of the quality and quantitiy of food, even with a density as high as 150 young shrimp per square meter.

G. Growing pond feeding (II)

As mentioned previously, penaeid shrimp are abundant in the waters of tropical and subtropical areas. But even in tropical water, the water temperature seldom exceeds 30° C., except near shallow coastal areas. However, growing ponds tend to be influenced considerably by the ambient atmospheric temperature. Consequently, the water temperature in a growing pond may be over 30° C. during eight or nine months or more out of a year. Therefore, live food is most desirable feeding for the growing pond.

Furthermore, even though fresh food materials are accessible to the pond, decay of the food fed in the pond water of over 30° C. will be rapid, resulting in contamination at the bottom of the pond. The decaying material produces $H_2S$, resulting in drastic reduction of the growth of penaeid shrimp.

For this reason controlled management of quality and quantity of the food must be provided. Tropical and subtropical waters have great advantages for shrimp growth, such as the longer duration of daylight in winter time, and constant higher temperature which cannot be expected where the climate is mild as, for example, in the Inland Sea area of Japan. The productivity per unit area in shrimp cultivation in warmer waters will be far greater than that of areas with a mild climate.

The artificial cultivation of penaeid shrimp in the tropical to subtropical areas depends heavily on (1) the coordinated utilization of the abundant sun-energy and the constant supply of water of suitable temperature and (2) on proper control of food and pollution.

In other words, productivity depends largely on how the abundant sun energy and the natural supply of water are utilized for shrimp cultivation. They make it possible to lower the cost of production and also to produce the necessary live-food in large quantity.

The required characteristics of the live-food are as follows:

It must be, at least to a large extent, a food of invertebrate origin which the penaeid shrimp feed on favorably.

It must have a short life cycle, maturing in a short period of time and having vigorous productivity.

Artemia grow preferably by feeding on micro-organisms. At present the most suitable live-food that meets the above mentioned characteristics is artemia.

Of all the known foods available in quantity, artemia is the one food which appears most adequately to meet all the requirements. The advantages of artemia are summarized:

(1) When the water temperature is more than 25° C. artemia reach maturity within 15 days (in some cases within 7 days). The weight of an artemia at its maturity is about 0.01 gr. Through parthenogenesis, satisfactory propagation of artemia takes place in its maturity.

(2) The artemia is a filter feeder, therefore, there is definitely no cannibalism among them.

(3) The artemia feeds mainly on micro-organisms supplied and grown by use of fertilizer of organic and inorganic nature.

Artemia not only provide the most suitable food for the penaeid shrimp from mysis to young stages but also are suitable for the growth of the young shrimp to adulthood. Furthermore, continual artemia propagation can be obtained relatively easily by suitable feeding of micro-organisms. All things considered, live artemia appears to be the best food for the cultivation of penaeid shrimp. Where the water temperature is more than 30° C., such as in tropical and subtropical areas, it is an indispensable food.

In short, the cultivation of penaeid shrimp, when artemia is fully used, can be achieved and essentially controlled by the simple control of the supply of organic or inorganic fertilizer which produces the micro-organisms which in turn feed the artemia.

H. The method of propagation of artemia for the cultivation of penaeid shrimp (1) Artemia eggs vary greatly in the number per/gram, according to their source or orgin. One gram of Utah or Canadian artemia contains about 280,000 eggs. San Francisco artemia contains about 570,000 eggs per gram.

(2) There are also differences in hatching rate which vary with the source of the eggs and also with differences in water salinity. Data are shown in Table III.

kg. of San Francisco product artemia eggs is calculated below.

When San Francisco product eggs were immersed in distilled water, 33 percent of them floated to the surface. The hatching rate of the floated eggs was only 15 percent. The remainder, which settled on the bottom, had a hatching rate of about 80 percent. Therefore, the average hatching rate can be valued at about 50 percent. San Francisco products contained 570,000 eggs per gram, but for calculation purposes, a rough count of 500,000 eggs per gram was used. An adult artemia weighs an average of about 0.01 gr.

Simple calculation shows that about 2.5 tons of adult artemia can be produced from 1 kg. of eggs. Furthermore, additional propagation of artemia can be obtained through natural parthenogenesis.

To assist the propagation of artemia, the mixture of partially decomposed Ulvacea plant with organic fertilizer is found to be useful in bringing about a vigorous parthenogenesis.

The area of a typical and standard growing pond is 50,000 m.$^2$. Considering a typical production of penaeid shrimp per square meter of pond area as 1.5 kg., the total production per pond is 75 tons. When the quantity of food required for weight increase has a coefficient of 10 (times the weight increase) the necessary total weight of artemia to produce the 75 tons of shrimp, assuming no other food is used, is 750 tons.

A 50,000 m.$^2$ pond two meters deep contains roughly 100,000 tons of water. When daily production of artemia is 50 gr. (5000 adult artemia of 0.01 gr.) per ton of water, and the duration of the productive days is 300 days per year, 1,500 tons of artemia can be produced in one pond in a year. That is, one pond is required to produce enough artemia for two growing ponds of the size and productivity described. See FIG. 6 and the description above.

The arrangement of the ponds is preferably to have one artemia pond between each pair of growing ponds, with sluice ways to run water in either direction from pond to pond. Suitable nets or screens will be used to control movement of shrimp and other particles.

When the water temperature is more than 25° C., hatching of artemia takes place after about 15 hours of incubation period and is completed within two days and

TABLE III.—CHANGES IN HATCHING RATES, WITH VARIATIONS IN SALINITY

| Test Date | Purchasing Date | | | | | |
|---|---|---|---|---|---|---|
| | Canada 1965 | | Canada '66, Nov. 1966 | Utah 1965 | | San Francisco '65, Dec. 1966 |
| | Sept. 1965 | Nov. 1966 | | Sept. 1965 | Nov. 1966 | |
| Salinity (°/oo): | | | | | | |
| 1.3 | | | 64 | 54, 41 | | |
| 4.0 | | | 74 | 55, 59 | | 79 |
| 7.9 | | | | 52, 54 | 8 | 75 |
| 11.9 | 76, 76 | 77 | | 57, 54 | 69 | |
| 15.8 | | | | 52, 59 | 8 | 80 |
| 19.8 | 82, 73 | 67 | | 53, 47 | 61 | 79, 82 |
| 23.7 | | | | 49, 55 | 74 | 18 | 88 |
| 27.7 | 78, 65, 82, 71, 62 | 71 | | 53, 39 | | |
| 31.6 | 69, 78 | | | 49, 33 | 68 | 10 | 75 |
| 35.6 | | 60 | | 52, 46 | | 12 | 76, 82, 83 |
| 39.5 | 51, 53 | | | 34, 33 | 69 | 15 | 83 |
| 49.2 | 41, 40 | | | | 69 | | |
| Temperature, °C | 25, 27 | 27 | 27 | 26–27 | 27 | 27 |

For the tests reported in Table III, 100 eggs were used in each experiment. (Only eggs which settled to the bottom of a container when immersed in distilled water were used.) (Kurata, H. "Agriculture," vol. 14, No. 4.)

According to the above data, the hatching rate of Utah artemia eggs within the salinity range of 10–15‰ showed less change than other types. The Canadian product eggs decreases in hatching rate when salinity become over 30‰. The San Francisco product eggs showed a lowering of hatching rate below 15‰ and above 40‰.

By referring to the above results, the production of 1 one night. The eggs of artemia should not be placed directly in the artemia growing pond where they will settle to the bottom. Eggs which settle on the bottom of a growing pond may not hatch because they become enmeshed in the sediment. Therefore, hatching should take place in a separate tank or area having a clean bottom until nauplii are produced. The nauplii must then be transferred to the tank or pond having fertilizer to produce microorganisms. Aeration of the hatching tank produces a better hatching rate and use of a high density of eggs per unit area is possible.

I. Growing pond feeding (III)

For large growing ponds with an area of considerable expanse, for instance 500,000 m.$^2$–1,000,000 m.$^2$ or more, propagation of several species of bivalve as supplemental food is desirable. To culture the bivalve, special feed is not necessary.

The bivalve larvae, which are hatched from eggs, will have a plankton-like life for awhile and during this period they metamorphose to larvae shell. After that the larval shells settle down on the bottom and transfer to benthos life. At the time when the larvae have just metamorphosed to larval shells, the shells are extremely small and also soft, which provides very suitable live food for the penaeid shrimp. By culturing several species of bivalves which have different spawning periods in the same growing pond, a year round supply of live food can be provided within a single growing pond.

J. Factors to be considered

The following factors can be derived from detailed analytic examination of results of Experiments I–IV:

(1) When the quality of food is not suitable, quantity alone cannot prevent vigorous cannibalism among the shrimp. The production rate may drop below 20 percent.

(2) With controlled management of quality and quantity of food, cannibalism can be positively prevented, increasing the production rate to 80 percent and in some cases to nearly 100 percent. The time required for rearing shrimp to marketable size is about 5 months under good growing conditions.

(3) It is possible to produce 2.5 kg. of penaeid shrimp per square meter within 5 months of rearing period by controlling the quality and quantity of food.

(4) When water temperature continues at more than 30° C. for an extended time, this tends to lower the vitality and increase the mortality of the shrimp. Use of live food can largely correct this.

(5) It is necessary to maintain oxygen content above about 2.5 cc./l. by applying sufficient aeration, but a brief temporary lowering of oxygen level below 2 cc./l. usually has no damaging effects on the shrimp.

(6) In order to minimize the damage by entry of harmful fishes into the pond, flow of water from the open sea must be controlled and/or properly filtered.

The above data were taken from experiments conducted in mild climate areas where a good growth period is about four months, four months of reduced growth, and four months of no growth during a year.

In tropical and subtropical coastal areas where growth of the penaeid shrimp can be expected all year around, the annual production of shrimp per unit area can be doubled or more.

The following conditions must be met to achieve the above mentioned production.

(1) The use of live food of invertebrate origin should be as great as economically possible.

(2) In case a sufficient amount of live food is not obtainable, supplemental fresh food must be added to the live-food feeding.

(3) To prevent entrance of harmful fish into the pond, the water in and out from the open sea must be filtered or controlled.

(4) Sufficient aeration should be provided to maintain the oxygen content in the pond above 2.5 cc./l. To achieve this oxygen level, various known techniques of aeration such as introducing air through spargers from a compressor, or by mechanical agitation, etc., can be used to serve the purpose.

(5) A continuous, gentle current of water flow in the pond must be maintained. To generate a water current, a power-driven mechanical means is preferred instead of depending on a current generated by tidal flow in and out of the pond.

IN SUMMARY

The drawings show how choice of species will help production (especially *a* or *b*, FIG. 1), various ways for growing the shrimp in hatching tank, culture tank and growing pond, and transferring them at suitable times (FIG. 2). The use of partitions 31, 32, mechanical water impelling means 33, oxygen supply means 34, 35, and other filter gates or partitions 36, 37, 38, FIG. 3 for permitting inflow and outflow of water to and from the sea and to and from the respective tanks and pond. This has been described above. These filters or screens should be so sized (usually about 80 mesh) as to exclude fish eggs as well as predatory fish.

Obvious variations in arrangement of tanks and other facilities will suggest themselves to those skilled in the art.

What is claimed is:

1. The method of culturing shrimp artificially, which comprises growing diatoms in saline water to a concentration sufficient to limit penetration of sunlight to upper levels of said water, hatching shrimp in said saline water causing circulation of said diatoms in said water, and feeding the larvae first on said diatoms and latter on invertebrate meat, while substantially maintaining an oxygen content in said water of at least about 2.5 cubic centimeters per liter.

2. The method of claim 1 wherein the water temperature is maintained in a range which is between 25° C. and 30° C.

3. Method according to claim 1 which includes maintaining an environmental water temperature of at least about 20° C.

4. Method according to claim 1 which includes maintaining an environmental water temperature below about 32° C.

5. Method according to claim 1 wherein the diatomaceous food includes various species of diatoms contained in natural seawater.

6. Method according to claim 1 which includes introduction of natural sea water with filtration to exclude predatory fish and their eggs.

7. Method according to claim 1 which includes use of live artemia as at least part of the invertegrate meat.

8. Method according to claim 1 which includes the simultaneous culture of artemia to supply live food for the growing shrimp.

9. Method according to claim 8 which includes using a separate tank for hatching artemia and using fertilizer therein to grow plant and live micro-organisms as food for the artemia.

10. A method for the artificial cultivation of shrimp in saline water which comprises, in combination, the steps of selecting penaeid shrimp by species having a near optimum combination of high early growth rate and long spawning period, feeding the zoea first on plankton and later adding live artemia to their diet, and maintaining the temperatures in the saline water between about 25° C. and 33° C.

11. Method according to claim 10 which includes mechanical agitation of the water.

12. Method according to claim 10 which includes introduction of filtered sea water to supply plankton while excluding predatory fish and their eggs.

13. Method according to claim 10 which includes addition of nutrient salts to the saline water to augment growth of plankton.

14. Method according to claim 10 which includes feeding live artemia in the mysis and later stages of shrimp development.

15. Method according to claim 10 which includes addition of ground meat.

16. Method according to claim 15 wherein the meat includes bivalve meat.

17. Method according to claim 10 wherein the water in the growing ponds has a depth of at least 1.5 meters.

18. Method according to claim 10 wherein saline water enclosures are arranged with three enclosures in a unit, of which two are arranged for growing shrimp and the third is arranged for producing artemia to feed the shrimp.

19. A method of cultivating prawn which comprises:
(a) enclosing saline water and maintaining such saline water free of predators of prawn,
(b) maintaining the oxygen content of the enclosed saline water at least about 2.5 cc./l. by providing aeration, and a gentle circulation of the saline water within the enclosure,
(c) inserting prawn in sufficient numbers into the enclosure of saline water to provide at least 1 kg. per square meter at maturity, and
(d) feeding the prawn in the mysis and later stages of development with invertebrate food.

20. The method of claim 19 wherein the invertebrate food includes live artemia.

21. The method of claim 20 wherein the artemia are hatched in a separate body of saline water and grow to maturity and procreate, including parthenogenesis, before the shrimp are transferred to the saline water in the enclosure.

22. The method of claim 21 wherein parthenogenesis is stimulated by feeding the artemia an abundant supply of live micro-organisms cultivated by compost placed in a separate body of saline water.

23. The method of claim 19 wherein the shrimp inserted in the enclosed saline water are in the nauplius stage or later stages of development.

24. The method of hatching shrimp to provide at least a 50 percent hatching rate which comprises:
(a) selecting adult female shrimp which are ready to spawn and placing them in an enclosure of saline water until spawning takes place and then removing the shrimp which have spawned,
(b) filtering the saline water before entry into the enclosure with an 80–100 mesh net to remove foreign particles which would cause a reduction of the hatching rate,
(c) testing the hatching rate to determine if it is at least 50 percent, and
(d) further filtering the saline water before entry into the enclosure if the tested hatching rate is less than 50 percent.

25. The method of claim 24 wherein the further filtering is performed by passing the saline water through sand and gravel before entry into the enclosure.

26. The method of claim 25 wherein the sand and gravel is at least one meter in depth.

27. The method of claim 24 wherein the hatched prawn are fed diatoms in the zoea stage.

28. The method of claim 25 wherein the hatched prawn are fed diatoms in the zoea stage.

29. The method of claim 24 wherein the hatched prawn are fed invertebrate meat from the mysis through the adult stages.

30. The method of claim 25 wherein the hatched prawn are fed invertebrate meat from the mysis through the adult stages.

31. The method of claim 29 wherein the invertebrate meat includes live artemia.

32. The method of claim 30 wherein the invertebrate meat includes live artemia.

33. A system which includes a growing pond of saline water and a smaller tank having walls and bottom of synthetic fibrous material woven in a fine mesh which is substantially watertight to receive saline water and nutrient salt and shrimp larvae, and means including buoyant devices attached to said smaller tank for suspending said smaller tank in said growing pond, whereby said fine mesh retains the shrimp larvae and nutrient salt in and excludes predatory fish and their eggs from said tank.

34. A system for the cultivation of shrimp including:
(a) an enclosed body of saline water constituting a growing pond,
(b) a plastic woven watertight container disposed within said growing pond,
(c) buoyant means coupled to said container for floating said container in said growing pond, and
(d) means for filtering saline water and supplying said filtered water to fill said container.

35. A system for cultivating shrimp in an enclosed body of saline water which comprises a growing pond closed from open natural saline water by a screen having a mesh not larger than about 80, said growing pond having a bottom which is covered with a layer of sand at least 20 centimeters in depth.

36. The method of cultivating shrimp in an enclosed body of saline water constituting a growing pond closed from open natural saline water by a screen having a mesh not larger than about 80, comprising providing a layer of sand over the bottom of the growing pond, and cultivating perennial plants which grow vertically from the bottom to provide: (1) shelter for the growth of marine life on which the shrimp feed, and (2) to provide additional oxygen for the shrimp.

37. The method of claim 36 wherein the minimum depth of the saline water in the growing pond is maintained at least equal to 1.5 meter, thus to prevent:
(a) the growth of seaweed horizontally along the bottom because of passage of insufficient sunlight to the bottom,
(b) the generation of $H_2S$ on the bottom and the resulting establishment of a reduction layer which uses oxygen needed by the shrimp, and
(c) interference with the shrimp having free access to the sand on the bottom.

38. Method according to claim 36 wherein the growing pond is surrounded laterally by natural saline waters.

39. A system for cultivating shrimp in an enclosed body of sea water which comprises a growing pond, said growing pond being surrounded laterally by natural sea water and closed therefrom by only a screen having a mesh so sized as to exclude fish eggs as well as predatory fish while permitting inflow and outflow of water to and from the sea, said pond having a sand bottom and having a depth of sea water of at least about 1.5 meters.

40. In the method of culturing shrimp artificially in a culture tank having a water temperature of at least about 25° C. including the step of feeding the mysis larvae with artemia nauplii by placing artemia eggs in the culture tank while the larvae are in the zoea III stage.

References Cited

UNITED STATES PATENTS

| | | | |
|---|---|---|---|
| 68,871 | 9/1867 | Green | 119—3 |
| 78,952 | 6/1868 | Furman | 119—3 |
| 313,458 | 3/1885 | Turner | 119—3 |
| 1,660,259 | 2/1928 | Elsworth | 119—4 |
| 2,822,329 | 2/1958 | Griffith | 119—3 X |
| 2,920,606 | 1/1960 | Anderson | 119—2 |
| 2,955,569 | 10/1960 | Dahlin | 119—3 |
| 3,158,135 | 11/1964 | Kimmerle | 119—3 |
| 3,166,043 | 1/1965 | Castillo | 119—3 |
| 3,196,833 | 7/1965 | Glancy | 119—4 |
| 3,387,587 | 6/1968 | Kelley et al. | 119—2 |

OTHER REFERENCES

Farm Fish Ponds and Their Management, Fishery Leaflet 27, U.S. Dept. of the Interior, Fish and Wildlife Service, Bu. of Sport Fisheries and Wildlife, September 1945, p. 6 relied upon.

Propagation of Pond Fishes, Document #1056, date 1929, U.S. Bureau of Fisheries, pp. 26–32.

Shrimp Nursery, Clarence P. Idyll, "National Geographic," vol. 127, No. 5, May 1965, pp. 636–659.

ALDRICH F. MEDBERY, Primary Examiner

PO-1050
(5/69)

UNITED STATES PATENT OFFICE
CERTIFICATE OF CORRECTION

Patent No. 3,477,406      Dated November 11, 1969

Inventor(s) MOTOSAKU FUJINAGA

It is certified that error appears in the above-identified patent and that said Letters Patent are hereby corrected as shown below:

Column 2, line 8, correct the spelling of "postlarval";
Column 3, line 66, "sawning" should be --spawning--;
Column 4, line 49, the word "three" is repeated;
        line 59, after "at" insert --temperatures a little below 25°C. or above 30°C. When the water--
        lines 64-65, the word "provide" is misspelled;
Column 5, line 38, correct the spelling of "zoea";
Column 6, line 16, correct the spelling of "hyalinum";
        line 27, correct the spelling of "aestuarii";
        line 36, change "need" to --needed--;
        lines 42 and 45, change "$Na_2SiO_4$" to --$Na_2SiO_3$--;
Column 7, line 42, change "1,425,000,000" to --14,250,000,000--;
Column 9, line 5, change "Zostela" to --Zostera--;
Column 10, line 48, correct the spelling of "aqueduct";
        line 56, change "93" to --83--;
Column 11, line 69, correct the spelling of "vertebrate
        line 71, correct the spelling of "Mollusca";
Column 12, lines 17 and 40, correct the spelling of "invertebrate";
Column 13, line 59, correct the spelling of "deficiency"
        line 62, correct the spelling of "superior";
Column 17, line 39, cancel"/";
        line 40, correct the spelling of "origin";
        line 62, "25,27" should be --25-27--.
These figures appear in the column labeled Canada, Sept. 1965 in the last line;
        line 72, correct the spelling of "decreased";
        line 73, correct the spelling of "became";
Column 19, line 9, correct the spelling of "larval";
Column 20, line 23, correct the spelling of "later";
        line 43, correct the spelling of "invertebrat Signed and sealed this 15th day of September 1970.

(SEAL)
Attest:

EDWARD M. FLETCHER, JR.
Attesting Officer

WILLIAM E. SCHUYLER, JR.
Commissioner of Patents

Dedication 3,477,406.—*Motosaku Fujinaga*, Tokyo, Japan. METHOD OF CULTIVATION OF PENAEID SHRIMP. Patent dated Nov. 11, 1969. Dedication filed Nov. 10, 1972, by the assignee, *Marifarms, Incorporated*.
Hereby dedicates to the Public the full term of said patent.
[*Official Gazette December 26, 1972.*]